Dec. 14, 1948.  S. IMERMAN  2,456,418
BUSHING AND METHOD OF MANUFACTURING SAME
Filed Aug. 28, 1944
FIG.1.
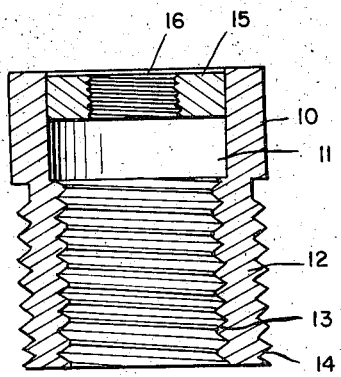
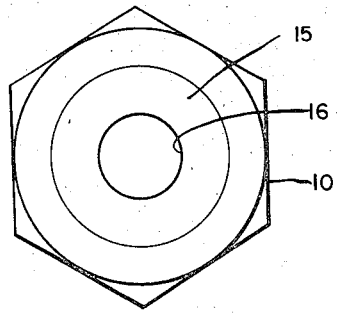
FIG.2.
INVENTOR.
STANLEY IMERMAN
BY
Whittemore Hulbert & Belknap
ATTORNEYS Patented Dec. 14, 1948

2,456,418

UNITED STATES PATENT OFFICE 2,456,418

BUSHING AND METHOD OF MANUFACTURING SAME

Stanley Imerman, Detroit, Mich.

Application August 28, 1944, Serial No. 551,600

4 Claims. (Cl. 285—160)

The invention relates to bushings and more particularly to a bushing having a sleeve portion threaded inside and outside and having a head containing an opening of smaller diameter than the inner threaded opening.

The object of the invention is to produce a bushing of the above type by a method involving low costs yet resulting in a product of high quality.

Heretofore bushings of the type mentioned have been manufactured by using a Hubbard type spring washer inserted in an opening in the head of the bushing. While many bushings have been manufactured in this manner, the resulting products are often not satisfactory because of the fact that the spring washer loosens during service.

According to the present invention, a metal disk is inserted within a recess in the head of the bushing, and a brazing powder is applied to the surface of the disk. The assembly is then heated in a non-oxidizing atmosphere such as hydrogen to a temperature sufficient to melt the brazing powder which then flows into the space between the disk and bushing and, upon cooling, solidifies to form a bond. During this operation the threaded portion of the bushing is maintained free from scale or oxides because of the reducing atmosphere.

In the drawings:

Figure 1 is a longitudinal section through a bushing made in accordance with the invention; and Figure 2 is a top plan view thereof.

The bushing consists of a head 10 preferably of hexagonal shape having an annular recess 11 therein. A sleeve 12 projects from the head and is provided with internal threads 13 and external threads 14. A disk 15 is inserted within the recess 11 and has a central threaded aperture 16. The disk is brazed to the head to form a permanent assembly and this is preferably accomplished by placing a measured amount of a brazing powder, such as copper, on the disk and then heating in a non-oxidizing atmosphere, such as hydrogen, until the powder is molten and enters the space between the disk and head where, after cooling, it solidifies and forms a bond between the parts.

While I have illustrated one particular form of bushing, it is to be understood that the invention is applicable to bushings of other types wherein it is desirable to have a metallic portion projecting inwardly from the internal bore of the bushing, thus making it uneconomical to machine the part from a single piece of stock.

What I claim as my invention is:

1. A bushing comprising a hollow rod having a portion threaded externally and internally and also having an enlarged polygonal head portion with a recess therein of greater diameter than the internal threads, and a disk fitting within said recess and brazed therein, said disk having a central threaded aperture.

2. The method of manufacturing bushings comprising forming a bushing member having a portion which is internally and externally threaded and a portion which is externally polygonal and has an internal recess of greater diameter than the internal threads, separately forming a disk member which externally fits within said recess and has an internally threaded aperture therein, and brazing said disk within said aperture.

3. A bushing comprising a hollow rod having a portion threaded externally and internally and also having an enlarged polygonal head portion with a recess therein of greater diameter than the internal threads, and a disk fitting within said recess and brazed therein.

4. The method of manufacturing bushings comprising forming a bushing member having a portion which is internally and externally threaded and a portion which is externally polygonal and has an internal recess of greater diameter than the internal threads, separately forming a disk member which externally fits within said recess, and bracing said disk within said aperture.

STANLEY IMERMAN.

REFERENCES CITED

The following references are of record in the file of this patent:

UNITED STATES PATENTS

| Number | Name | Date |
|---|---|---|
| 1,144,425 | Meaker | June 29, 1915 |
| 1,205,666 | Rosenfeld | Nov. 21, 1916 |
| 1,700,604 | Wagener | Jan. 29, 1929 |
| 1,758,869 | Trazeser et al. | May 13, 1930 |
| 1,845,901 | Bassler | Feb. 16, 1932 |
| 1,982,850 | Banks | Dec. 4, 1934 |
| 2,060,959 | Terry | Nov. 17, 1936 |
| 2,121,984 | Rieger et al. | June 28, 1938 |
| 2,315,006 | Misch | Mar. 30, 1943 |
| 2,320,032 | Danforth | May 25, 1943 |
| 2,364,109 | Taylor | Dec. 5, 1944 |

FOREIGN PATENTS

| Number | Country | Date |
|---|---|---|
| 1,180 | Great Britain | Jan. 18, 1901 |
| 494,455 | Great Britain | Oct. 26, 1938 |

OTHER REFERENCES

"Sil-fos and Easy-Flo," Bulletin No. 12-A. Published 1943 by Handy & Harman, 82 Fulton St., New York, N. Y. Copy in Division 14.